(12) United States Patent
Kim et al.

(10) Patent No.: US 9,891,441 B2
(45) Date of Patent: Feb. 13, 2018

(54) STEREOSCOPIC DISPLAY DEVICE

(71) Applicant: BOE TECHNOLOGY GROUP CO., LTD., Beijing (CN)

(72) Inventors: Heecheol Kim, Beijing (CN); Chunfang Zhang, Beijing (CN); Yan Wei, Beijing (CN); Chao Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 49 days.

(21) Appl. No.: 14/353,519

(22) PCT Filed: Sep. 30, 2013

(86) PCT No.: PCT/CN2013/084759
§ 371 (c)(1),
(2) Date: Apr. 23, 2014

(87) PCT Pub. No.: WO2015/003431
PCT Pub. Date: Jan. 15, 2015

(65) Prior Publication Data
US 2015/0124316 A1 May 7, 2015

(30) Foreign Application Priority Data

Jul. 10, 2013 (CN) .......................... 2013 1 0287473

(51) Int. Cl.
*G02B 27/22* (2006.01)
*G02B 3/00* (2006.01)
(52) U.S. Cl.
CPC ....... *G02B 27/2214* (2013.01); *G02B 3/0062* (2013.01); *G02B 3/005* (2013.01)

(58) Field of Classification Search
CPC ... G02B 27/2214; G02B 3/0062; G02B 3/005
(Continued)

(56) References Cited

U.S. PATENT DOCUMENTS 2,086,556 A * 7/1937 Jacobson ...................... 359/458
6,151,089 A * 11/2000 Yang et al. ................... 349/113
(Continued)

FOREIGN PATENT DOCUMENTS

CN 2921860 Y 7/2007
CN 101620319 A 1/2010
(Continued)

OTHER PUBLICATIONS

PCT Written Opinion of the International Searching Authority and International Search Report dated Apr. 21, 2014, Application No. PCT/CN2013/084759, 11 Pages.
(Continued)

*Primary Examiner* — Zachary Wilkes
*Assistant Examiner* — George G King
(74) *Attorney, Agent, or Firm* — Brooks Kushman P.C.

(57) ABSTRACT

The present invention provides a stereoscopic display device, comprising: a display panel and a lens grating, wherein further comprising: a waveform lens disposed between said display panel and said lens grating; the wave crest of said waveform lens corresponds to the black matrix area of said display panel, the wave trough of said waveform lens corresponds to the pixel area of said display panel. In the solution of the present invention, by employing the waveform lens disposed in front of the display panel, the crosstalk between images can be decreased and the stereoscopic image display effect can be improved while the luminance of the display panel does not become darken.

15 Claims, 3 Drawing Sheets

(58) Field of Classification Search
USPC .................................................. 359/463, 619
See application file for complete search history.

(56) References Cited

U.S. PATENT DOCUMENTS

| | | | |
|---|---|---|---|
| 2008/0225205 A1* | 9/2008 | Travis | 349/65 |
| 2010/0165221 A1 | 7/2010 | Krijn et al. | |
| 2012/0057100 A1* | 3/2012 | Masuda et al. | 349/62 |
| 2012/0062991 A1* | 3/2012 | Krijn et al. | 359/463 |

FOREIGN PATENT DOCUMENTS

| | | |
|---|---|---|
| CN | 102523470 A | 6/2012 |
| CN | 102662208 A | 9/2012 |
| CN | 202486466 U | 10/2012 |
| JP | S 592014 A | 1/1984 |
| JP | H0435192 A | 2/1992 |
| JP | H 09101483 A | 4/1997 |
| JP | 2002072134 A | 3/2002 |
| JP | 2005326574 A | 11/2005 |
| JP | 2007033655 A | 2/2007 |
| JP | 2011128636 A | 6/2011 |
| KR | 20110036916 A | 4/2011 |
| KR | 20110120037 A | 11/2011 |
| WO | 20080114813 A1 | 9/2008 |

OTHER PUBLICATIONS

Chinese First Office Action dated Nov. 17, 2014, Application No. 201310287473.X, 5 Pages.
Korean Office Action dated Apr. 21, 2015, Application No. 10-2014-7012652, 4 Pages.
Chinese Fourth Office Action dated Sep. 14, 2015, Application No. 201310287473.X, 7 Pages.
European Search Report dated Jan. 27, 2017, Application No. EP 13 84 6243 (PCT/CN2013084759), 7 Pages.
First Office Action for Japanese Application No. 2016-524654, dated Feb. 16, 2017, 5 Pages.
Second Office Action for Chinese Application No. 2016-524654, dated Apr. 28, 2017, 3 Pages.
English Translation of the International Search Report for Application No. PCT/CN2013/084759, dated Apr. 21, 2014, 2 Pages.

* cited by examiner

STEREOSCOPIC DISPLAY DEVICE

CROSS-REFERENCE TO RELATED APPLICATION

This application is the U.S. national phase of PCT Application No. PCT/CN2013/084759 filed on Sep. 30, 2013, which claims priority to Chinese Patent Application No. 201310287473.X filed on Jul. 10, 2013, the disclosures of which are incorporated in their entirety by reference herein.

FIELD OF THE INVENTION

The present invention relates to a stereoscopic display technology, especially a stereoscopic display device.

DESCRIPTION OF THE PRIOR ART

A lens grating stereoscopic displayer based on binocular parallax is composed of a display panel and a grating disposed on the display panel, the stereoscopic displayer has a multiple of independent viewpoints, different images can be seen from different viewpoints. The display content of the stereoscopic displayer comes from the images by shooting one same scene from many directions; each viewpoint shows the image shot from one direction. In an ideal case, viewpoints are completely independent from each other, the display image (that is, parallax image) between any two viewpoints seen by a viewer has no crosstalk. That is, an image corresponding to a left eye viewpoint is seen by the left eye, an image corresponding to a right eye viewpoint is seen by the right eye. However, when an existing stereoscopic display device is viewed from the side, the image corresponding to the right eye viewpoint can be seen by the left eye, or the image corresponding to the left viewpoint can be seen by the right eye, which makes the viewer see a blur stereoscopic image, and the viewing effect is not good.

As shown in FIG. 1, in the lens grating stereoscopic displayer of the prior art, a backlight of a display panel 11 refracts two images having parallax respectively corresponding to two viewpoints to the left and right eyes of the viewer by a color filter and a lens grating 12, wherein 13 indicates a light of the backlight after passing through the color filter of displayer, the light 13 emits to the lens grating 12 and then emits to the eyes of the viewer, therefore images 14 and 15 corresponding to each viewpoint (such as the viewpoints corresponding to each pixel 110, 111, 112 in the display panel, wherein the pixels 110, 111, 112 may be red, green, blue three primary sub pixel, and the pixel R in the figure indicates the viewpoint which can be viewed by the right eye, the pixel L is a viewpoint that can be viewed by the left eye) can be seen by the viewer, and thus a stereoscopic vision is formed.

Because of the surface of the lens grating 12 in the prior art is spherical surface and the emergent light 13 of the display panel is scattered in different directions, the spherical surface lens grating 12 has spherical aberrations with regard to lights of different apertures, and has coma and astigmatism with regard to rim ray, these optical aberrations may make lights of an image enters into another image area after refraction, especially when viewed from the side, the crosstalk between images is formed, which lead the stereoscopic vision to worse.

The method for solving this problem may be, such as reducing the size of pixels; however, which may cause the luminance of the flat display panel to become lower, and the viewing effect becomes worse.

SUMMARY OF THE INVENTION

The technical problem to be solved by the present invention is to provide a stereoscopic display device, by employing the waveform lens disposed in front of the display panel, the present invention can decrease the crosstalk between images and improve the stereoscopic image display effect while the luminance of the display panel does not become darken.

To solve the above mentioned problem, an embodiment of the present invention provides a stereoscopic display device, comprising: a display panel and a lens grating, further comprising: a waveform lens disposed between said display panel and said lens grating; a wave crest of said waveform lens corresponds to a black matrix area of said display panel, a wave trough of said waveform lens corresponds to a pixel area of said display panel.

Alternatively, said waveform lens is a sine wave shaped lens or a cosine wave shaped lens.

Alternatively, one surface of the sine wave shaped lens is formed in a plane shape, and the cross sectional contour of the other surface is formed in a sine wave shape.

Alternatively, one surface of the cosine wave shaped lens is formed in a plane shape, and the cross sectional contour of the other surface is formed in a cosine wave shape.

Alternatively, said waveform lens is formed by continuous arrangement of concave lenses and convex lenses.

Alternatively, one waveform cycle of the waveform lens corresponds to one pixel area of said display panel.

Alternatively, said concave lenses are disposed to correspond to the pixel area of said display panel.

Alternatively, said convex lenses are disposed to correspond to the black matrix among the pixel areas of said display panel.

Alternatively, said lens grating is composed of convex lenses.

Alternatively, said lens grating is selected from the lens gratings with focal length of 5 mm~100 mm.

Alternatively, said waveform lens is disposed to correspond to the display area of said display panel.

Alternatively, said waveform lens is selected from the lenses with focal length of 1.0 mm~5.0 mm.

The beneficial effects of above technical solution of the present invention are that: in the above mentioned solution, by employing the waveform lens disposed in front of the display panel, the crosstalk between images can be decreased and the stereoscopic image display effect can be improved while the luminance of the display panel does not become darken.

DETAILED DESCRIPTION OF THE PREFERRED EMBODIMENTS

Figure 1:
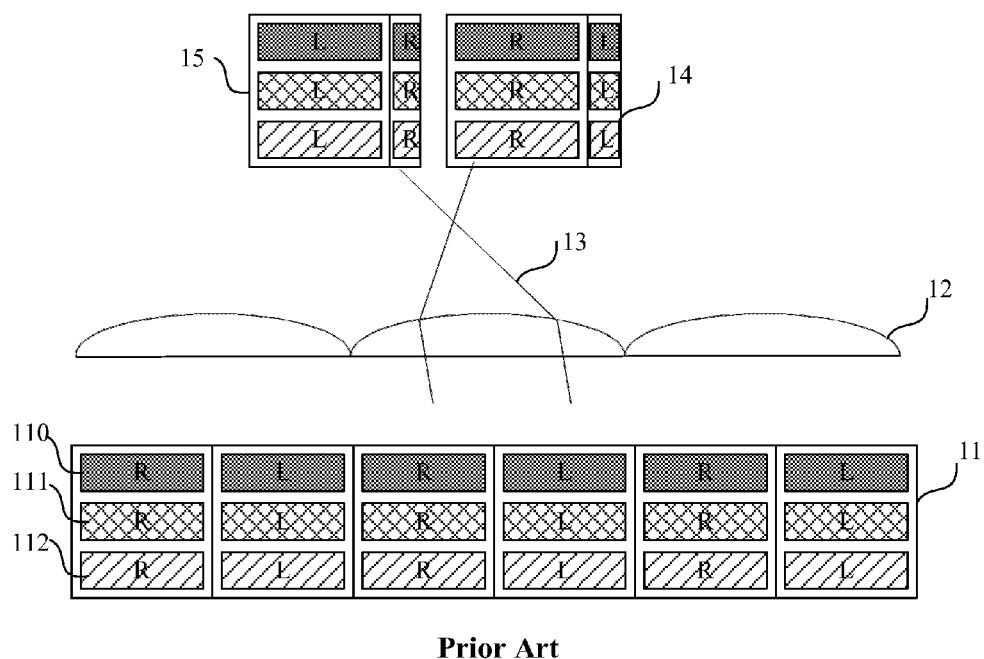
FIG. 1 shows a plane structural view of a stereoscopic display device of the prior art.

Hereafter, the embodiments referring to the drawings will be described in detail so as to make the technical problem to be solved, the technical solution and the advantages clearer.

Figure 2:
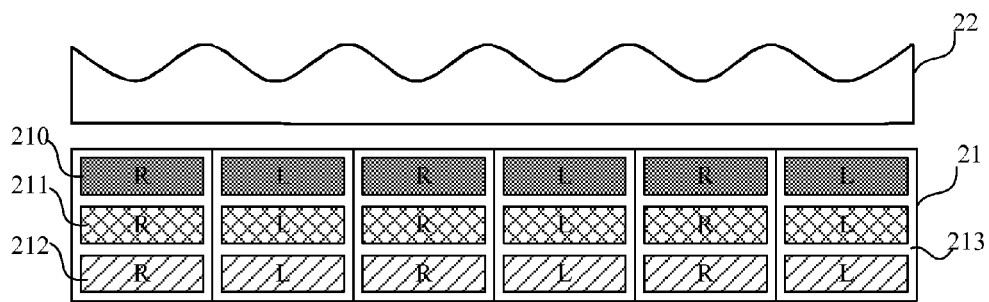
FIG. 2 shows a plane structural view of a stereoscopic display device of the present invention.

As shown in FIG. 2, an embodiment of the present invention provides a stereoscopic display device, which comprises: a display panel 12 and a lens grating (not shown), further comprises: a waveform lens 22 disposed between the display panel 12 and the lens grating, a wave crest of the waveform lens 22 corresponds to a black matrix area of the display panel, a wave trough of the waveform lens 22 corresponds to a pixel area of the display panel. Alternatively, the waveform lens 22 can be a sine wave shaped lens, of course, the waveform lens 22 also can be a cosine wave shaped lens, as long as the wave crest corresponds to the black matrix area of the display panel and the wave trough corresponds to the pixel area of the display panel.

Alternatively, one surface of the sine wave shaped lens is formed in a plane shape, and the cross sectional contour of the other surface is formed in a sine wave shape. One surface of the cosine wave shaped lens is formed in a plane shape, and the cross sectional contour of the other surface is formed in a cosine wave shape. The waveform lens is formed by continuous arrangement of concave lenses and convex lenses. One waveform cycle of the waveform lens corresponds to one pixel area 210, 211 or 212 of the display panel 21. The concave lenses are disposed to correspond to the pixel areas of the display panel. The convex lenses are disposed to correspond to the black matrix 213 among the pixel areas of the display panel.

Figure 3:
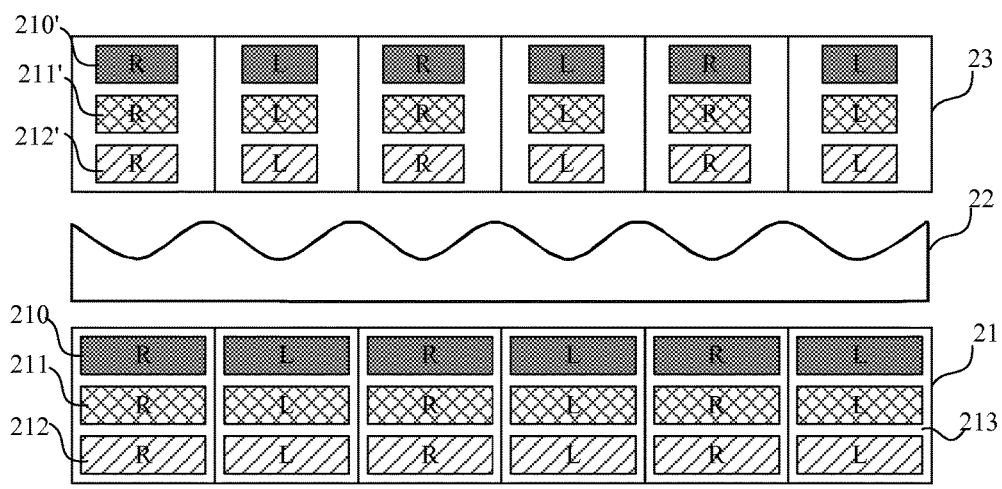
FIG. 3 shows a schematic view of the image displayed by the stereoscopic display device as shown in FIG. 2.

According to the embodiment of the present invention, the sine wave shaped lens or the cosine wave shaped lens is disposed between the display panel and the lens grating, and specifically, the waveform lens can be formed by continuous arrangement of the concave lenses and the convex lenses, the concave lenses are disposed to correspond to the pixel areas of the display panel, therefore, after the light from the pixel area entering into the concave lens, the enlargement factor of the light spot of the light through the pixel of the pixel area of the display panel is decreased based on the principle that image shown by the concave lens is decreased, therefore the sub pixels 210', 211', 212' as viewed in viewpoint image 23 are decreased compared to the sub pixels 210, 211, 212 of the display panel (as shown in FIG. 3), accordingly the chance of emitting the left image to the right viewing area is greatly decreased, the chance of emitting the right image into the left viewing area is also greatly decreased, thus, the crosstalk between the left parallax image and the right parallax image is decreased; even when viewed from the side, the crosstalk between the left parallax image and the right parallax image cannot occur. In the above mentioned embodiment of the present invention, there is no need to decrease the size of pixel physically, thus, the crosstalk between images is decreased and the stereoscopic image display effect is improved while the luminance of the display panel does not become darken.

Figure 4:
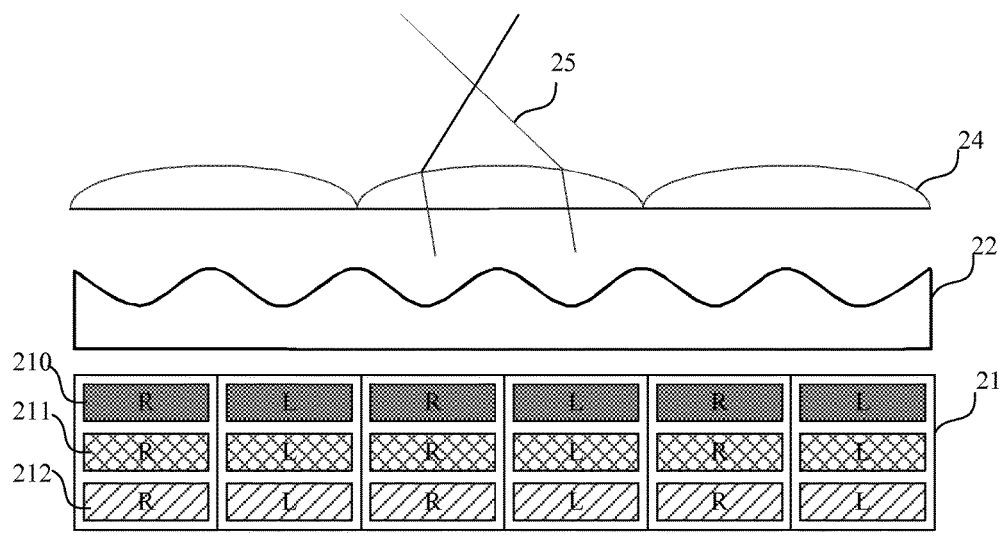
FIG. 4 shows a structural view of an embodiment of the stereoscopic display device as shown in FIG. 2.

Moreover, as shown in FIG. 4, the above mentioned display device further comprises: a lens grating 24 disposed away from the display panel by a predetermined distance, the waveform lens 22 (sine wave shaped lens or cosine wave shaped lens) is disposed between the display panel 12 and the lens grating 24. Alternatively, the lens grating 24 is composed of convex lenses.

Figure 5:
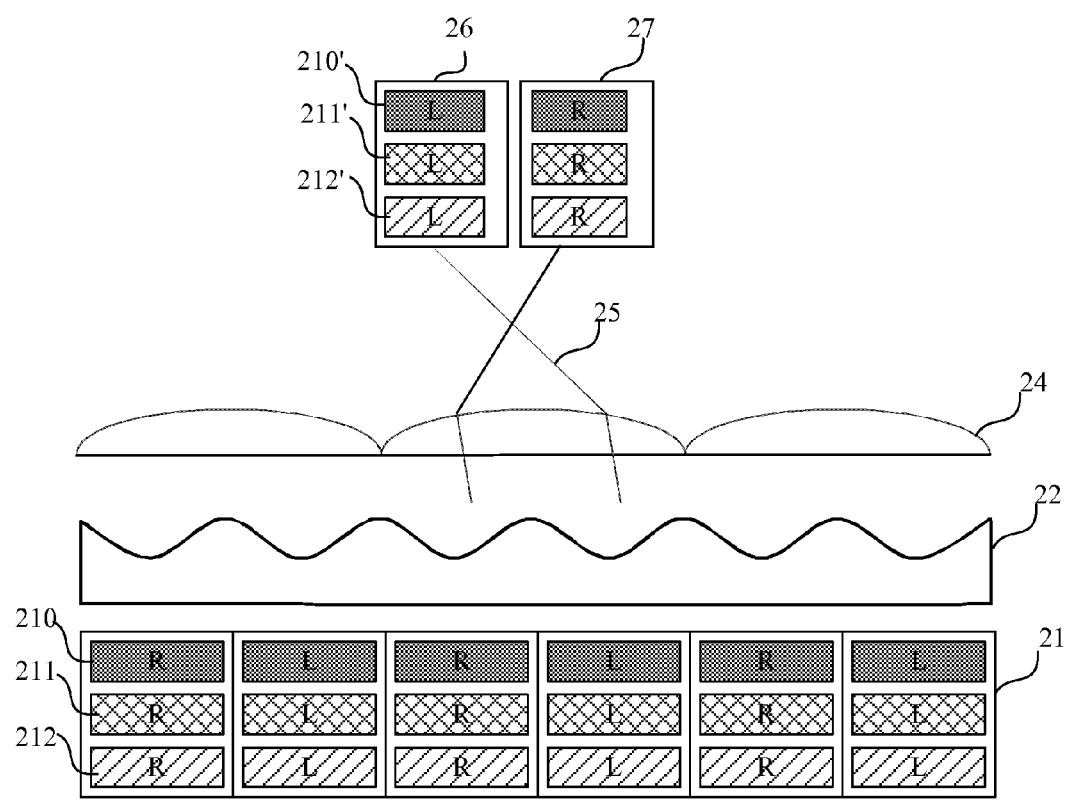
FIG. 5 shows a schematic view of a pixel display image as seen from the stereoscopic display device as shown in FIG. 4.

Specifically, as shown in FIG. 5, the light 25 emitted from the backlight of the display panel 21 enters into the waveform lens 22 (sine wave shaped lens or cosine wave shaped lens) through a color filter of the display panel 21, then enters into the lens grating 24, and the emitted light 25 enters into the eyes of the viewer.

The principle of the present invention is described in detail as below.

As shown in FIGS. 3 to 5, because the waveform lens 22 (sine wave shaped lens or cosine wave shaped lens) is formed by continuous arrangement of concave lenses and convex lenses, when the light emitted from the pixel area passes through the concave lens, the light is in a diffusing state, and the images of the left and right eye viewpoints are imaged respectively in the area between the concave lens and lens grating 24, and according to the principle that image shown by the concave lens is decreased, images of the left and right eye viewpoints are decreased images, so that the enlargement factor of the light spot of the light through the pixel of the pixel area of the display panel is decreased, therefore the sub pixels 210', 211', 212' as viewed in viewpoint image 23 are decreased compared to the sub pixels 210, 211, 212 of the display panel (as shown in FIG. 3 and FIG. 5), and because the convex lens corresponds to the portion of the black matrix, the light may not emit from the convex lens; the emitted light from the concave lens enters into the lens grating 24 again and is refracted by the lens grating 24, because the lens grating 24 is composed of convex lenses, the light refracted by the lens grating 24 may converge, so that the image 26 corresponding to the left eye viewpoint is emitted into the left eye of viewer, and the image 27 corresponding to the right eye viewpoint is emitted into the right eye of viewer, and then the chance of emitting the left image to the right viewing area is greatly decreased, the chance of emitting the right image into the left viewing area is also greatly decreased, thus, the image crosstalk may not occurred or the image crosstalk phenomenon can be decreased in the above mentioned embodiment of the present invention.

In the above mentioned embodiments of the present invention, the waveform lens 22 (sine wave shaped lens or cosine wave shaped lens) can be selected from the lenses with focal length of 1.0 mm~5.0 mm, the lens grating 24 can be selected from the lens gratings with focal length of 5 mm~100 mm.

Moreover, in the above mentioned embodiments of the present invention, the waveform lens 22 (sine wave shaped lens or cosine wave shaped lens) is disposed to correspond to the display area of the display panel, the size of the lens grating 24 is equal to the size of the waveform lens 22 (sine wave shaped lens or cosine wave shaped lens).

The waveform lens 22 (sine wave shaped lens or cosine wave shaped lens) can be disposed in front of the display panel 21 with 0.05 mm~5.0 mm distance, the lens grating 24 can be disposed in front of the display panel 21 with 5 mm~100 mm distance.

In the above mentioned embodiment of the present invention, by employing the waveform lens 22 (sine wave shaped lens or cosine wave shaped lens), the crosstalk between images is decreased and the stereoscopic image display effect is improved while the luminance of the display panel does not become darken.

The above mentioned is only preferred implementation of the present invention, it should be pointed out that it can be made some improvement and embellish on the premise of without departing from the principle of the present invention by those skilled in the art, these improvement and embellish should be seen as the protection scope of the present invention as well.

What is claimed is:

1. A stereoscopic display device, comprising: a display panel and a lens grating, further comprising: a lens having a repeating structure formed by a plurality of repeating portions and disposed between said display panel and said lens grating;
wherein a locally thicker portion of said lens corresponds to a black matrix area of said display panel, a locally thinner portion of said lens corresponds to a pixel area of said display panel, and the pixel area is a pixel array formed by a plurality of sub pixels, wherein the lens comprises a planar surface disposed closer to the display panel than the locally thicker portion and the locally thinner portion of the lens;
wherein the display panel comprises a backlight source, wherein light of the backlight source passes through the display panel, the lens, and the lens grating in that order;
wherein said lens is formed by a continuous arrangement of concave lenses and convex lenses, said concave lenses are disposed to correspond to the pixel areas of said display panel, and said convex lenses are disposed to correspond to the black matrix area among the pixel areas of said display panel;
wherein said lens grating is formed by a plurality of repeating portions which are arranged continuously, wherein each repeating portion of the lens grating is arranged to correspond to two concave lenses and one convex lens of the lens, and each repeating portion of the lens grating is arranged to correspond to two columns of sub pixels.

2. The stereoscopic display device according to claim 1, wherein said lens is a sine wave shaped lens or a cosine wave shaped lens.

3. The stereoscopic display device according to claim 2, wherein the cross-sectional contour of the other surface of the lens is formed in a sine wave shape.

4. The stereoscopic display device according to claim 2, wherein the cross-sectional contour of the other surface of the lens is formed in a cosine wave shape.

5. The stereoscopic display device according to claim 1, wherein one repeating cycle of said lens corresponds to one sub pixel of said display panel.

6. The stereoscopic display device according to claim 1, wherein said lens grating is composed of convex lenses.

7. The stereoscopic display device according to claim 6, wherein said lens grating is selected from the lens gratings with focal length of 5 mm to 100 mm.

8. The stereoscopic display device according to claim 1, wherein said lens is disposed to correspond to the display area of said display panel.

9. The stereoscopic display device according to claim 1, wherein said lens is selected from the lenses with focal length of 1.0 mm to 5.0 mm.

10. The stereoscopic display device according to claim 2, wherein said lens grating is composed of convex lenses.

11. The stereoscopic display device according to claim 3, wherein said lens grating is composed of convex lenses.

12. The stereoscopic display device according to claim 4, wherein said lens grating is composed of convex lenses.

13. The stereoscopic display device according to claim 5, wherein said lens grating is composed of convex lenses.

14. A stereoscopic display device comprising:
a display panel;
a lens grating; and
a smoothly curved waveform lens having a repeating structure, formed by a plurality of repeating portions and disposed between the display panel and the lens grating, the waveform lens comprising a surface having a locally thicker portion corresponding to a black matrix area of the display panel and a locally thinner portion corresponding to a pixel area of the display panel, and the pixel area is a pixel array formed by a plurality of sub pixels, the waveform lens further comprising a planar surface disposed closer to the display panel than the surface having the locally thicker portion and the locally thinner portion;
the display panel comprising a backlight source having light capable of passing through the display panel, the waveform lens, and the lens grating;
wherein said waveform lens is formed by a continuous arrangement of concave lenses and convex lenses, said concave lenses are disposed to correspond to the pixel areas of said display panel, and said convex lenses are disposed to correspond to the black matrix areas among the pixel areas of said display panel;
wherein said lens grating is formed by a plurality of repeating portions which are arranged continuously, wherein each repeating portion of the lens grating is arranged to correspond to two concave lenses and one convex lens of the waveform lens, and each repeating portion of the lens grating is arranged to correspond to two columns of sub pixels.

15. A stereoscopic display device comprising:
a display panel;
a lens grating; and
a lens having a continuous repeating structure of alternating concave lenses and convex lenses which is formed by a plurality of repeating portions, the lens being disposed between the display panel and the lens grating, the lens comprising an uneven surface having locally thicker portions corresponding to black matrix areas of the display panel and locally thinner portions corresponding to pixel areas of the display panel, and each pixel area being a pixel array formed by a plurality of sub pixels, the lens further comprising a planar surface disposed closer to the display panel than the uneven surface;
the display panel comprising a backlight source having light capable of passing through the display panel, the lens and the lens grating;
wherein said concave lenses of said lens are disposed to correspond to the pixel areas of said display panel, and said convex lenses of said lens are disposed to correspond to the black matrix areas among the pixel areas of said display panel;
wherein said lens grating is formed by a plurality of repeating portions which are arranged continuously, wherein each repeating portion of the lens grating is arranged to correspond to two concave lenses and one convex lens of the lens, and each repeating portion of the lens grating is arranged to correspond to two columns of sub pixels.

* * * * *